(12) United States Patent
Feng

(10) Patent No.: US 11,068,115 B1
(45) Date of Patent: Jul. 20, 2021

(54) TOUCH SCREEN PANEL

(71) Applicant: WUHAN CHINA STAR OPTOELECTRONICS SEMICONDUCTOR DISPLAY TECHNOLOGY CO., LTD., Wuhan (CN)

(72) Inventor: Xiaoliang Feng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 463 days.

(21) Appl. No.: 16/309,062

(22) PCT Filed: Sep. 25, 2018

(86) PCT No.: PCT/CN2018/107375
§ 371 (c)(1),
(2) Date: Dec. 11, 2018

(87) PCT Pub. No.: WO2020/037763
PCT Pub. Date: Feb. 27, 2020

(30) Foreign Application Priority Data

Aug. 22, 2018 (CN) .......................... 201810961821.X

(51) Int. Cl.
G06F 3/044 (2006.01)
G06F 3/041 (2006.01)

(52) U.S. Cl.
CPC .......... G06F 3/0448 (2019.05); G06F 3/0412 (2013.01); G06F 3/0443 (2019.05)

(58) Field of Classification Search
None
See application file for complete search history.

(56) References Cited

U.S. PATENT DOCUMENTS

| 2014/0176490 | A1 | 6/2014 | Zhou et al. |
| 2018/0059843 | A1 | 3/2018 | Kim |
| 2018/0107379 | A1 | 4/2018 | Jia et al. |
| 2018/0113345 | A1* | 4/2018 | Song .................. G02F 1/13338 |
| 2018/0190723 | A1 | 7/2018 | Han et al. |
| 2018/0239465 | A1* | 8/2018 | Jang ....................... G06F 3/047 |
| 2019/0317631 | A1 | 10/2019 | Feng et al. |

FOREIGN PATENT DOCUMENTS

| CN | 103376938 A | 10/2013 |
| CN | 103901650 A | 7/2014 |
| CN | 104345997 A | 2/2015 |
| CN | 105511705 A | 4/2016 |
| CN | 108255362 A | 7/2018 |
| CN | 108281460 A | 7/2018 |

* cited by examiner

Primary Examiner — Duane N Taylor, Jr.
(74) Attorney, Agent, or Firm — Kirton McConkie; Evan R. Witt

(57) ABSTRACT

A touch screen panel is provided and includes an electrode layer. The electrode layer includes a first induction electrode and a second induction electrode. The first induction electrode includes a plurality of first induction electrode units. The adjacent first induction electrode units are electrically connected by the bridge layer. Both the first induction electrode units and the second induction electrode are strip-shaped. The position of long sides of the first induction electrode units corresponds to the position of long sides of the second induction electrode.

18 Claims, 4 Drawing Sheets

TOUCH SCREEN PANEL

FIELD OF THE INVENTION

The present disclosure relates to the technical field of display, and more particularly to a touch screen panel.

DESCRIPTION OF THE RELATED ART

With the continuous development of the electronic technology, touch screens have gradually spread in people's lives. Touch screens have the advantages of high firmness and durability, fast response, space saving, easy communication and the like.

In order to realize the touch function of an Organic Light-Emitting Diode (OLED) display panel, a mesh-like metallic touch layer is generally provided on an OLED device. Considering the influence on the display of pixels from the metallic touch layer, the line width of the mesh-like metal is to be reduced to avoid shading pixels while the stability of touch signals of the touch layer is ensured.

At present, an electrode layer in a touch screen is generally manufactured in a conventional diamond pattern. This design would weaken the touch signals due to interference of cathodes. Therefore, at present, it is urgent to provide a touch screen panel to solve the above problems.

SUMMARY OF THE INVENTION

The present application provides a touch screen panel in order to solve the problem that touch signals are weakened due to that a touch layer in an existing touch screen panel is easily interfered.

In accordance with one aspect of the present application, a touch screen panel is provided and includes:
 a substrate on which a plurality of pixels are provided;
 a bridge layer disposed above the substrate;
 an insulating layer disposed above the bridge layer, vias being formed on the insulating layer; and
 an electrode layer disposed above the insulating layer;
 the electrode layer is shaped in a mesh that is not overlapped with the pixels and includes a first induction electrode and a second induction electrode, the first induction electrode extends in a first direction, the first induction electrode is divided into a plurality of first induction electrode units by the second induction electrode, the adjacent first induction electrode units are electrically connected by the bridge layer, the first induction electrode and the second induction electrode are adjacent to and insulated from each other, and the position of long sides of the first induction electrode is parallel to the position of long sides of the second induction electrode; and
 both the first induction electrode units and the second induction electrode are strip-shaped, and the position of long sides of the first induction electrode units corresponds to the position of long sides of the second induction electrode.

According to one embodiment of the present disclosure, the second induction electrode includes a plurality of second induction electrode units which are electrically connected to each other.

According to one embodiment of the present disclosure, the bridge layer includes bridge units; and
 one of the first induction electrode units is bridged to an adjacent first induction electrode unit extending in the first direction by one of the bridge units.

According to one embodiment of the present disclosure, the bridge units are shaped in a mesh that is not overlapped with the pixels.

According to one embodiment of the present disclosure, each of the bridge units includes a first end and a second end both connected to the vias, the first end and the second end are connected in a double-bridge interconnection manner, and the double bridges include a first bridge line and a second bridge line.

According to one embodiment of the present disclosure, the double bridges are connected in a mesh interconnection manner.

According to one embodiment of the present disclosure, a grid in each of the bridge units includes four vertices;
 each of the first end and the second end includes at least four adjacent vertices, and four of the adjacent vertices form closed patterns connected to each other;
 two of the adjacent vertices of the first end and two of the adjacent vertices of the second end are connected to form the first bridge line, and the other two of the adjacent vertices of the first end and the other two of the adjacent vertices of the second end are connected to form the second bridge line; and
 both the first bridge line and the second bridge line are shaped in a mesh.

According to one embodiment of the present disclosure, the electrode layer is made from at least one of aluminum, copper, gold, silver, platinum, magnesium, niobium, neodymium, graphene and nano-silver.

According to one embodiment of the present disclosure, the touch screen panel further includes a waterproof layer and a protective layer;
 the waterproof layer is located between the substrate and the electrode layer; and
 the protective layer is located above the electrode layer.

In accordance with one aspect of the present application, a touch screen panel is provided and includes:
 a substrate on which a plurality of pixels are provided;
 a bridge layer disposed above the substrate;
 an insulating layer disposed above the bridge layer, vias being formed on the insulating layer; and
 an electrode layer disposed above the insulating layer;
 the electrode layer is shaped in a mesh that is not overlapped with the pixels and includes a first induction electrode and a second induction electrode, the first induction electrode extends in a first direction, the first induction electrode is divided into a plurality of first induction electrode units by the second induction electrode, the adjacent first induction electrode units are electrically connected by the bridge layer, the first induction electrode and the second induction electrode are adjacent to and insulated from each other; and
 both the first induction electrode units and the second induction electrode are strip-shaped, and the position of long sides of the first induction electrode units corresponds to the position of long sides of the second induction electrode.

According to one embodiment of the present disclosure, the second induction electrode includes a plurality of second induction electrode units which are electrically connected to each other.

According to one embodiment of the present disclosure, the bridge layer includes bridge units; and
 one of the first induction electrode units is bridged to an adjacent first induction electrode unit extending in the first direction by one of the bridge units.

According to one embodiment of the present disclosure, the bridge units are shaped in a mesh that is not overlapped with the pixels.

According to one embodiment of the present disclosure, each of the bridge units includes a first end and a second end both connected to the vias, the first end and the second end are connected in a double-bridge interconnection manner, and the double bridges include a first bridge line and a second bridge line.

According to one embodiment of the present disclosure, the double bridges are connected in a mesh interconnection manner.

According to one embodiment of the present disclosure, a grid in each of the bridge units includes four vertices;

each of the first end and the second end includes at least four adjacent vertices, and four of the adjacent vertices form closed patterns connected to each other;

two of the adjacent vertices of the first end and two of the adjacent vertices of the second end are connected to form the first bridge line, and the other two of the adjacent vertices of the first end and the other two of the adjacent vertices of the second end are connected to form the second bridge line; and both the first bridge line and the second bridge line are shaped in a mesh.

According to one embodiment of the present disclosure, the electrode layer is made from at least one of aluminum, copper, gold, silver, platinum, magnesium, niobium, neodymium, graphene and nano-silver.

According to one embodiment of the present disclosure, the touch screen panel further includes a waterproof layer and a protective layer;

the waterproof layer is located between the substrate and the electrode layer; and the protective layer is located above the electrode layer.

The present application provides a touch screen panel. By designing the first induction electrode and the second induction electrode in the touch electrode layer as a strip-shaped structure having a variable length-to-width ratio, the area of the first induction electrode corresponding to the second induction electrode is increased, and the intensity of touch signals in the touch screen panel is thus improved.

BRIEF DESCRIPTION OF THE DRAWINGS

In order to explain the technical solutions in the present embodiments or in the prior art more clearly, accompanying drawings required in the description of the present embodiments or prior art will be briefly described. Obviously, accompanying drawings are just some embodiments of the present disclosure, while other drawings may be obtained by those skilled in the art according to these drawings, without paying out any creative work.

DETAILED DESCRIPTION OF THE PREFERRED EMBODIMENTS

Figure 1:
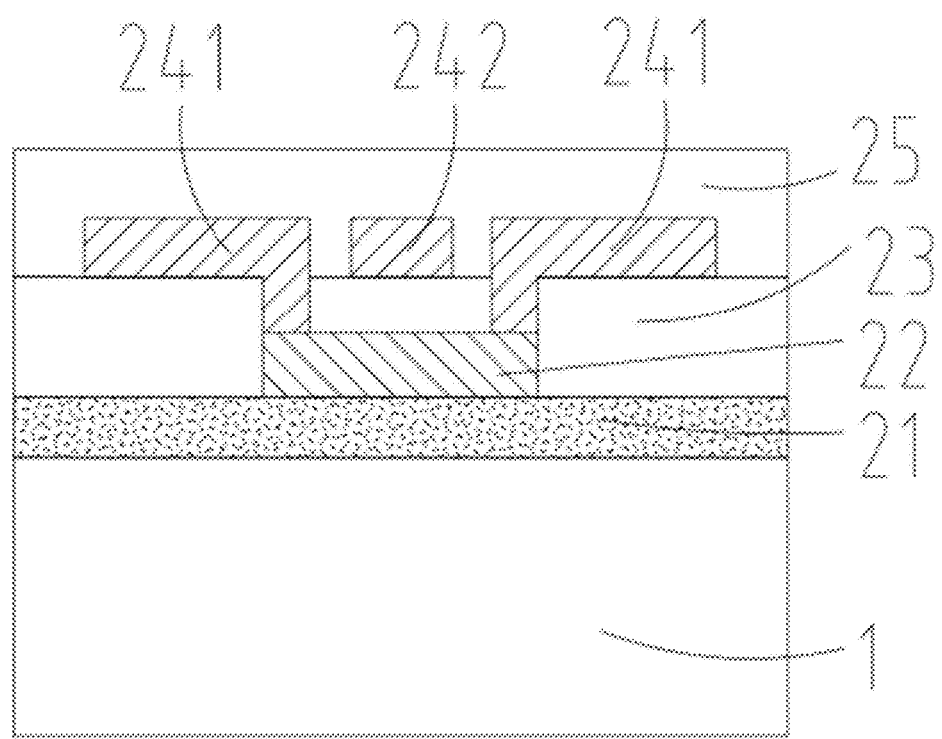
FIG. 1 is a schematic structure diagram of a touch screen panel according to an embodiment of the present application.

The following description of the embodiments is used for illustrating, with reference to the accompanying drawings, particular embodiments in which the present application can be implemented. The directional terms, as used herein, such as "upper", "lower", "front", "rear", "left", "right", "inner", "outer" or "side", merely refer to the directions shown with reference to the accompanying drawings. Therefore, the directional terms, as used herein, are merely for describing and understanding the present application, rather than limiting the present application. In the drawings, units of similar structures are denoted by similar reference numerals.

The present application provides a touch screen panel in order to solve the problem that touch signals are weakened due to that a touch layer in an existing touch screen panel is easily interfered. This embodiment can overcome this deficiency.

Figure 2:
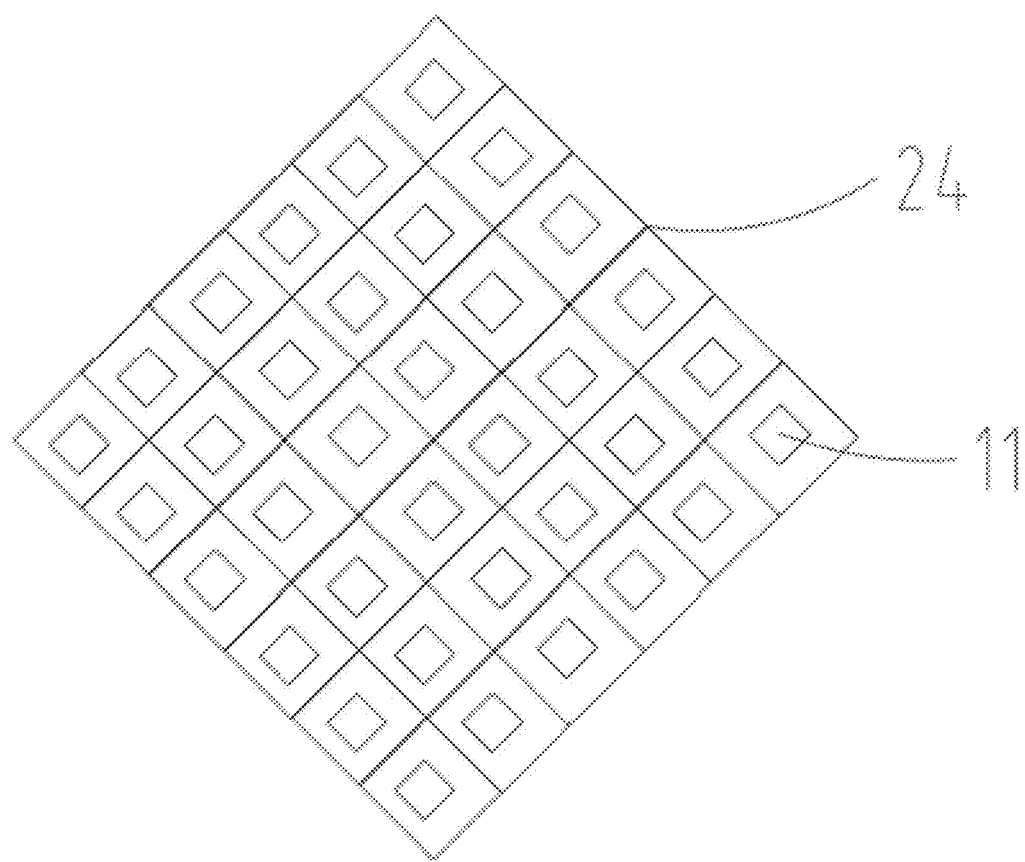
FIG. 2 is a schematic structure diagram of a positional relation between pixels and an electrode layer according to an embodiment of the present application.
Figure 3:
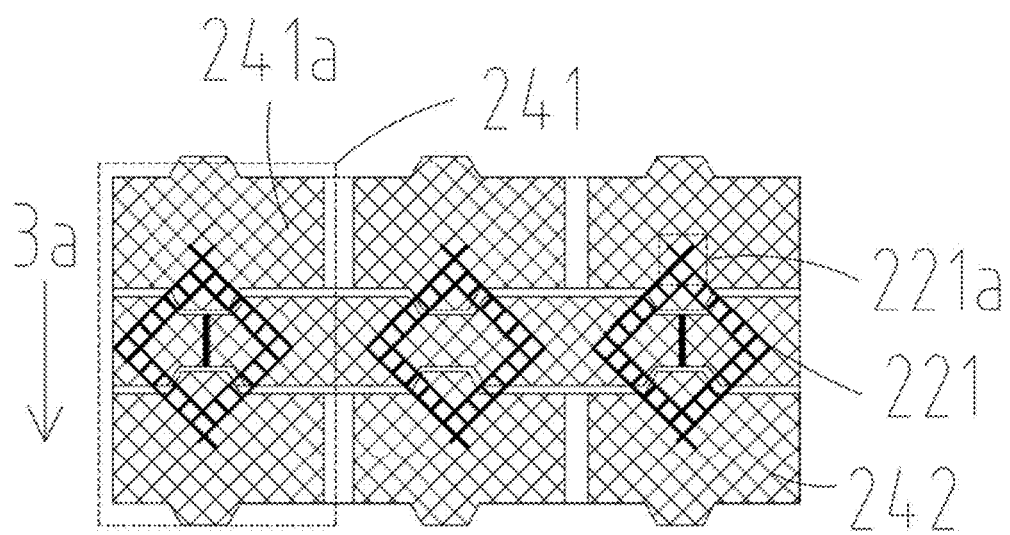
FIG. 3 is a schematic structure diagram of the electrode layer and a bridge layer according to an embodiment of the present application.
Figure 4:
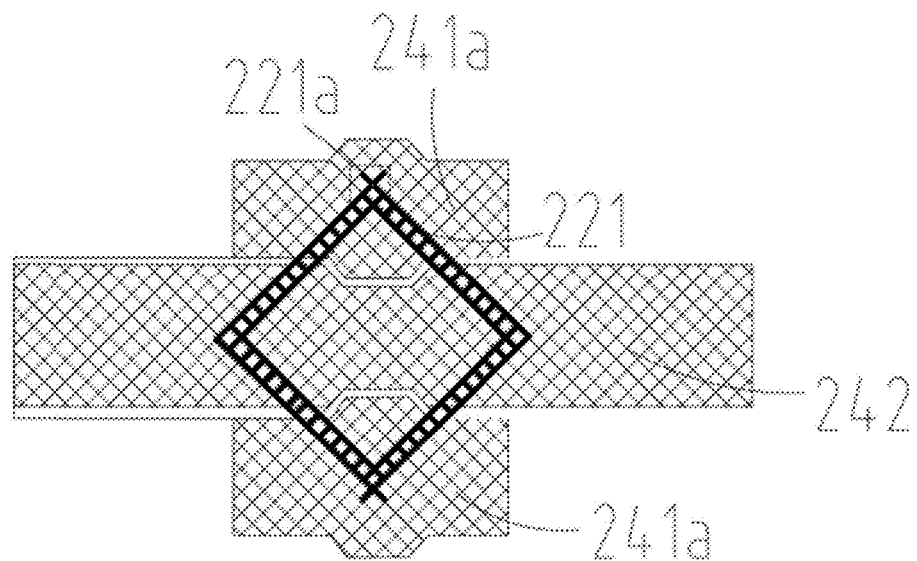
FIG. 4 is a schematic structure diagram of a touch unit according to an embodiment of the present application.
Figure 5:
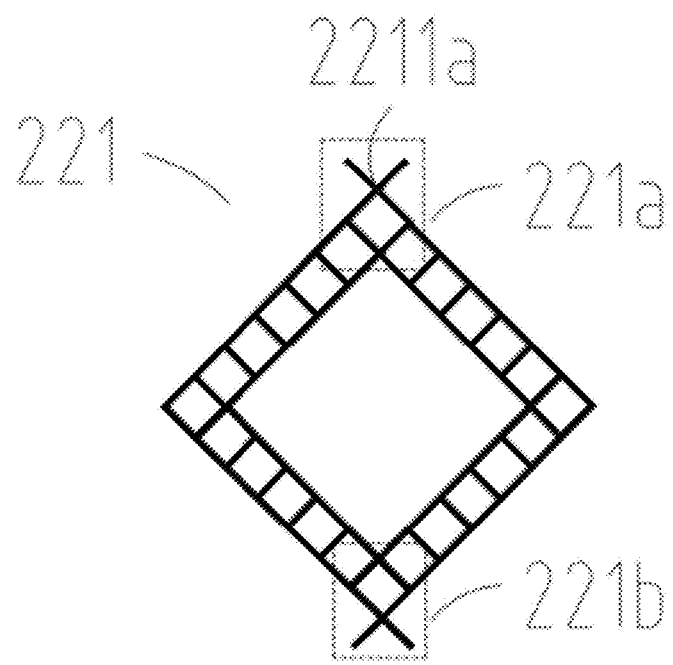
FIG. 5 is a schematic structure diagram of a bridge unit according to an embodiment of the present application.
Figure 6:
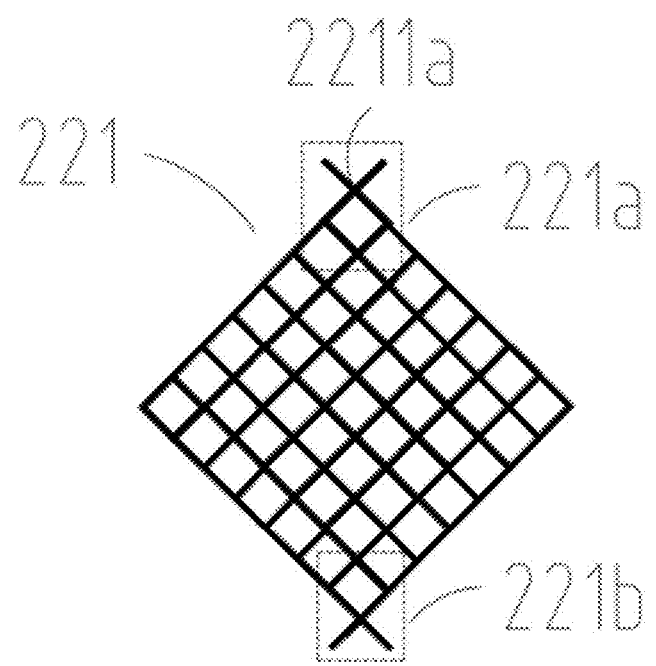
FIG. 6 is a schematic structure diagram of the bridge unit according to another embodiment of the present application.

FIG. 1 is a schematic structure diagram of a touch screen panel according to an embodiment of the present application; FIG. 2 is a schematic structure diagram of a positional relation between pixels and an electrode layer according to an embodiment of the present application; FIG. 3 is a schematic structure diagram of the electrode layer and a bridge layer according to an embodiment of the present application; FIG. 4 is a schematic structure diagram of a touch unit according to an embodiment of the present application; FIG. 5 is a schematic structure diagram of a bridge unit according to an embodiment of the present application; and FIG. 6 is a schematic structure diagram of the bridge unit according to another embodiment of the present application.

The present application will be further described below by specific embodiments with reference to the accompanying drawings.

As shown in FIG. 1, the present application provides a touch screen panel, including:

a substrate 1 on which a plurality of pixels are provided;

a bridge layer 22 disposed above the substrate 1;

an insulating layer 23 disposed above the bridge layer 22, vias being formed on the insulating layer 23; and an electrode layer disposed above the insulating layer 23.

In one embodiment, the touch screen panel of the present application is an On-Cell organic light-emitting touch screen panel. The substrate 1 includes an underlying substrate and an OLED layer disposed on a surface of the underlying substrate. The OLED layer includes a hole injection layer, a hole transport layer, an organic light-emitting layer, an electron transport layer, a cathode and an encapsulation layer. However, it should be understood that the present application is not limited to being applied to the On-Cell organic light-emitting touch panel and conventional liquid crystal display panels may also employ the related structure in the present application.

As shown in FIG. 2, a plurality of pixels 11 are provided on the substrate 1, and the pixels 11 are arranged in a display region of the substrate and delimited by data lines and scanning lines which are crisscrossed with each other. In one embodiment, the pixels may include blue pixels, red pixels and green pixels. Of course, the pixels may further include white pixels.

As shown in FIG. 3, the electrode is shaped in a mesh that is not overlapped with the pixels 11 and includes a first induction electrode 241 and a second induction electrode 242. The first induction electrode 241 extends in a first direction, and the first induction electrode 241 is divided into a plurality of second induction electrode units 241a by the second induction electrode 242. The adjacent first induction electrode units 241a are electrically connected by the bridge layer. The first induction electrode 241 and the second induction electrode 242 are adjacent to and insulated from each other.

In one embodiment, the first induction electrode 241 is a driving electrode and the second induction electrode 242 is a receiving electrode. In another embodiment, the first induction electrode 241 is a receiving electrode, the second induction electrode 242 is a driving electrode, and the touch screen panel delivers touch signals by the first induction electrode 241 and the second induction electrode 242.

The first induction electrode 241 and the second induction electrode 242 form induction capacitance. When a user touches the panel, the pressure will cause a change in the induction capacitance and then the touch information is delivered. The area, forming the capacitance, between the first induction electrode 241 and the second induction electrode 242 is an important indicator of the intensity of the touch signal. Therefore, it is desirable for those skilled in the prior art to increase the area, forming the capacitance, between the first induction electrode 241 and the second induction electrode 242 in various ways.

In one embodiment, the first induction electrode 241 is divided into a plurality of first induction electrode units 241a by the second induction electrode 242, and both the first induction electrode units 241a and the second induction electrode 242 are strip-shaped. The position of long sides of the first induction electrode units 241a corresponds to the position of long sides of the second sensing electrode 242.

In one embodiment, the area of the position of long sides of the first induction electrode units 241a corresponding to the position of long sides of the second induction electrode 242 will influence the size of the touch capacitance.

Both the first induction electrode units 241a and the second induction electrode 242 are strip-shaped. By appropriately designing the length-to-width ratio of the strip shape according to actual needs, the area of the position of long sides of the first induction electrode units 241a corresponding to the position of long sides of the second induction electrode 242 may be better increased, and the intensity of the touch signal is further improved.

In one embodiment, bumps are provided on the long sides of the first induction electrode units 241a at positions corresponding to the second induction electrode 242. Recesses are provided on the second induction electrode 242 at positions corresponding to the bumps. The bumps are matched with the recesses.

In one embodiment, the second induction electrode 242 includes a plurality of second induction electrode units which are electrically connected to each other.

As shown in FIG. 4, the position of long sides of the first induction electrode units 241a is parallel to the position of long sides of the second induction electrode 242 in order to realize the optimal design of the area of the position of long sides of the first induction electrode units 241a corresponding to the long sides of the second induction electrode 242.

In another embodiment, in order to realize the bridging of the first induction electrode units 241a, the touch screen further includes a bridge layer 22 and an insulating layer 23.

The insulating layer 23 is disposed above the electrode layer 24.

The bridge layer 22 is disposed above the insulating layer 23.

In one embodiment, vias are formed on the insulating layer 23, and the first induction electrode units 241a are electrically connected to the bridge layer 22 through the vias. In this design of the touch screen panel, the bridge layer 22 is disposed above the electrode layer 24.

In one embodiment, the bridge layer 22 includes bridge units 221.

One of the first induction electrode units 241a is bridged to an adjacent first induction electrode unit extending in the first direction 3a by one of the bridge units 221.

In order to prevent the bridge layer 22 from occluding the display of the pixels 11, the bridge units 221 are shaped in a mesh that is not overlapped with the pixels 11.

In one embodiment, the line width of the meshes in the first induction electrode 241, the second induction electrode 242 and the bridge units is greater than 1 μm but less than 3 μm. Thus, the influence on the display of the pixels 11 from the too large line width of the meshes in the first induction electrode 241, the second induction electrode 242 and the bridge units 241a will be avoided.

As shown in FIG. 5, however, if the line width is too small, the wiring in the bridge layer 22 is likely to break. Each of the bridge units 221 includes a first end 2211a and a second end 2211b both connected to the vias. The first end 2211a and the second end 2211b are connected in a double-bridge interconnection manner. The double bridges include a first bridge line and a second bridge line. By connecting the first end 2211a and the second end 2211b in a double-bridge interconnection manner, the interconnection of bridges can be improved and the resistance of the bridge layer can be reduced.

In one embodiment, as shown in FIG. 6, the double bridges are connected in a mesh interconnection manner.

In one embodiment, a grid in each of the bridge units 221 includes four vertices.

Each of the first end 2211a and the second end 2211b includes at least four adjacent vertices, and four of the adjacent vertices form closed patterns connected to each other.

Two of the adjacent vertices of the first end 2211a and two of the adjacent vertices of the second end 2211b are connected to form the first bridge line. The other two of the adjacent vertices of the first end 2211a and the other two of the adjacent vertices of the second end 2211b are connected to form the second bridge line.

In one embodiment, each of the first end 2211a and the second end 2211b includes six vertices, wherein four adjacent vertices form a square shape, and the remaining two vertices form a V-shape. The intersection of the V-shape is overlapped with the vertex of the square shape, so that the failed delivery of the touch signal due to the breakage of the wiring of the bridge units 221 is avoided.

In one embodiment, both the first bridge line and the second bridge line are shaped in a mesh.

In one embodiment, the electrode layer 24 is made from at least one of aluminum, copper, gold, silver, platinum, magnesium, niobium, neodymium, graphene and nano-silver.

The bridge layer 22 is also made from at least one of aluminum, copper, gold, silver, platinum, magnesium, niobium, neodymium, graphene and nano-silver.

In one embodiment, as shown in FIG. 1, the touch screen panel further includes a waterproof layer and a protective layer.

The waterproof layer 21 is located between the substrate 1 and the electrode layer 24.

The protective layer 25 is located above the electrode layer 24.

The present application provides a touch screen panel. By designing the first induction electrode and the second induction electrode in the touch electrode layer as a strip-shaped structure having a variable length-to-width ratio, the area of the first induction electrode corresponding to the second induction electrode is increased, and the intensity of touch signals in the touch screen panel is thus improved.

In conclusion, although the present application has been described above by preferred embodiments, the preferred embodiments are not intended to limit the present application. A person of ordinary skill in the art may make various alterations and modifications without departing from the spirit and scope of the present invention. Therefore, the protection scope of the present invention should be subject to the scope defined by the appended claims.

What is claimed is:

1. A touch screen panel, comprising:
   a substrate on which a plurality of pixels are provided;
   a bridge layer disposed above the substrate;
   an insulating layer disposed above the bridge layer, vias being formed on the insulating layer; and
   an electrode layer disposed above the insulating layer;
   the electrode layer is shaped in a mesh that is not overlapped with the pixels and comprises a first induction electrode and a second induction electrode, the first induction electrode extends in a first direction, the first induction electrode is divided into a plurality of first induction electrode units by the second induction electrode, the adjacent first induction electrode units are electrically connected by the bridge layer, the first induction electrode and the second induction electrode are adjacent to and insulated from each other, and the position of long sides of the first induction electrode is parallel to the position of long sides of the second induction electrode; and
   both the first induction electrode units and the second induction electrode are strip-shaped, and the position of long sides of the first induction electrode units corresponds to the position of long sides of the second induction electrode.

2. The touch screen panel according to claim 1, wherein the second induction electrode comprises a plurality of second induction electrode units which are electrically connected to each other.

3. The touch screen panel according to claim 2, wherein the bridge layer comprises bridge units; and
   one of the first induction electrode units is bridged to an adjacent first induction electrode unit extending in the first direction by one of the bridge units.

4. The touch screen panel according to claim 3, wherein the bridge units are shaped in a mesh that is not overlapped with the pixels.

5. The touch screen panel according to claim 4, wherein each of the bridge units comprises a first end and a second end both connected to the vias, the first end and the second end are connected in a double-bridge interconnection manner, and the double bridges comprise a first bridge line and a second bridge line.

6. The touch screen panel according to claim 5, wherein the double bridges are connected in a mesh interconnection manner.

7. The touch screen panel according to claim 5, wherein a grid in each of the bridge units comprises four vertices;
   each of the first end and the second end comprises at least four adjacent vertices, and four of the adjacent vertices form closed patterns connected to each other;
   two of the adjacent vertices of the first end and two of the adjacent vertices of the second end are connected to form the first bridge line, and the other two of the adjacent vertices of the first end and the other two of the adjacent vertices of the second end are connected to form the second bridge line; and
   both the first bridge line and the second bridge line are shaped in a mesh.

8. The touch screen panel according to claim 1, wherein the electrode layer is made from at least one of aluminum, copper, gold, silver, platinum, magnesium, niobium, neodymium, graphene and nano-silver.

9. The touch screen panel according to claim 2, further comprising a waterproof layer and a protective layer;
   the waterproof layer is located between the substrate and the electrode layer; and
   the protective layer is located above the electrode layer.

10. A touch screen panel, comprising:
    a substrate on which a plurality of pixels are provided;
    a bridge layer disposed above the substrate;
    an insulating layer disposed above the bridge layer, vias being formed on the insulating layer; and
    an electrode layer disposed above the insulating layer;
    the electrode layer is shaped in a mesh that is not overlapped with the pixels and comprises a first induction electrode and a second induction electrode, the first induction electrode extends in a first direction, the first induction electrode is divided into a plurality of first induction electrode units by the second induction electrode, the adjacent first induction electrode units are electrically connected by the bridge layer, the first induction electrode and the second induction electrode are adjacent to and insulated from each other; and
    both the first induction electrode units and the second induction electrode are strip-shaped, and the position of long sides of the first induction electrode units corresponds to the position of long sides of the second induction electrode.

11. The touch screen panel according to claim 10, wherein the second induction electrode comprises a plurality of second induction electrode units which are electrically connected to each other.

12. The touch screen panel according to claim 11, wherein the bridge layer comprises bridge units; and
    one of the first induction electrode units is bridged to an adjacent first induction electrode unit extending in the first direction by one of the bridge units.

13. The touch screen panel according to claim 12, wherein the bridge units are shaped in a mesh that is not overlapped with the pixels.

14. The touch screen panel according to claim 13, wherein each of the bridge units comprises a first end and a second end both connected to the vias, the first end and the second end are connected in a double-bridge interconnection manner, and the double bridges comprise a first bridge line and a second bridge line.

15. The touch screen panel according to claim 14, wherein the double bridges are connected in a mesh interconnection manner.

16. The touch screen panel according to claim 14, wherein a grid in each of the bridge units comprises four vertices;
    each of the first end and the second end comprises at least four adjacent vertices, and four of the adjacent vertices form closed patterns connected to each other;
    two of the adjacent vertices of the first end and two of the adjacent vertices of the second end are connected to form the first bridge line, and the other two of the adjacent vertices of the first end and the other two of the adjacent vertices of the second end are connected to form the second bridge line; and both the first bridge line and the second bridge line are shaped in a mesh.

17. The touch screen panel according to claim 10, wherein the electrode layer is made from at least one of aluminum, copper, gold, silver, platinum, magnesium, niobium, neodymium, graphene and nano-silver.

18. The touch screen panel according to claim 11, further comprising a waterproof layer and a protective layer;
 the waterproof layer is located between the substrate and the electrode layer; and
 the protective layer is located above the electrode layer.

\* \* \* \* \*